US009459496B2

(12) United States Patent
Suzuki et al.

(10) Patent No.: US 9,459,496 B2
(45) Date of Patent: Oct. 4, 2016

(54) DISPLAY PANEL AND DISPLAY DEVICE

(71) Applicant: BOE TECHNOLOGY GROUP CO., LTD., Beijing (CN)

(72) Inventors: Teruaki Suzuki, Beijing (CN); Guangkui Qin, Beijing (CN); Yafeng Yang, Beijing (CN); Xin Gu, Beijing (CN); Miki Kashima, Beijing (CN); Kiman Kim, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 7 days.

(21) Appl. No.: 14/647,726

(22) PCT Filed: Oct. 14, 2014

(86) PCT No.: PCT/CN2014/088565
§ 371 (c)(1),
(2) Date: May 27, 2015

(87) PCT Pub. No.: WO2015/139448
PCT Pub. Date: Sep. 24, 2015

(65) Prior Publication Data
US 2016/0041431 A1    Feb. 11, 2016

(30) Foreign Application Priority Data

Mar. 21, 2014    (CN) .......................... 2014 1 0108320

(51) Int. Cl.
*G02F 1/1337*    (2006.01)
*G02F 1/1343*    (2006.01)
*G02F 1/1335*    (2006.01)

(52) U.S. Cl.
CPC ... *G02F 1/133753* (2013.01); *G02F 1/133707* (2013.01); *G02F 1/134309* (2013.01); *G02F1/133512* (2013.01); *G02F 1/133784* (2013.01); *G02F 1/134363* (2013.01); *G02F 2001/133757* (2013.01); *G02F 2001/134345* (2013.01)

(Continued)

(58) Field of Classification Search
CPC ............... G02F 1/133753; G02F 1/133707; G02F 1/134309
See application file for complete search history.

(56) References Cited

U.S. PATENT DOCUMENTS

| 6,128,061 A | 10/2000 | Lee et al. |
|---|---|---|
| 2010/0112738 A1 | 5/2010 | Kazuyoshi et al. |
| 2013/0271707 A1 | 10/2013 | Sakamoto et al. |

FOREIGN PATENT DOCUMENTS

| CN | 1181517 A | 5/1998 |
|---|---|---|
| CN | 1760738 A | 4/2006 |

(Continued)

OTHER PUBLICATIONS

Analysis of Two Types of Multi-Domain IPS Viewing-Angle Characteristics, Research & Development Department, NLT Technologies, Ltd., Kawasaki, Kanagawa, Japan. SID 2012 Digest, pp. 375-378.

(Continued)

*Primary Examiner* — Joseph L Williams
(74) *Attorney, Agent, or Firm* — Harness, Dickey & Pierce, P.L.C.

(57) ABSTRACT

The present disclosure provides a display panel and a display device. The display panel includes a pixel unit including first and second sub-unit regions. Liquid crystal molecules in the liquid crystal layer corresponding to the first sub-unit region have a first initial alignment direction, and liquid crystal molecules in the liquid crystal layer corresponding to the second sub-unit region have a second initial alignment direction. The pixel unit further includes a third sub-unit region arranged between the first and second sub-unit regions. Liquid crystal molecules in the liquid crystal layer corresponding to the third sub-unit region have a third initial alignment direction, which is an alignment direction in a rotation from the first initial alignment direction towards the second initial alignment direction along a first rotation direction. An angle difference between the first and second initial alignment directions is greater than 0° and less than or equal to 90°.

20 Claims, 17 Drawing Sheets

(56) References Cited

FOREIGN PATENT DOCUMENTS

| CN | 101059626 A | 10/2007 |
| CN | 202033556 U | 11/2011 |
| CN | 102654686 A | 9/2012 |
| CN | 203178637 U | 9/2013 |
| CN | 104020607 A | 9/2014 |
| KR | 20070070043 A | 7/2007 |

OTHER PUBLICATIONS

Real Multi-Domain Reduced Color and Gamma Shift in Fringe-Field-Switching (FFS) Mode LCD with Photoalignment Method; R&D Center, Chunghwa Picture Tubes, Ltd, Taoyuan, Taiwan (R.O.C.); SID 2012 Digest, pp. 293-296.

Patent Reexamination Board of the State Intellectual Property Office of the PR. China, Reexamination Decision regarding Application No. 201 41 01 083209 dated May 24, 2016. Translation provided by Dragon Intellectual Property Law Firm.

International Search Report and Written Opinion mailed Jan. 20, 2015 regarding PCT/CN2014/088565. Translation provided by Dragon Intellectual Property Law Firm.

Chinese Office Action mailed Dec. 31, 2014 regarding Chinese Application No. 201410108320.9. Translation provided by Dragon Intellectual Property Law Firm.

Chinese Office Action mailed Apr. 22, 2015 regarding Chinese Application No. 201410108320.9. Translation provided by Dragon Intellectual Property Law Firm.

DISPLAY PANEL AND DISPLAY DEVICE

CROSS-REFERENCE TO RELATED APPLICATIONS

This application is the U.S. national phase of PCT Application No. PCT/CN2014/088565 filed on Oct. 14, 2014, which claims a priority of the Chinese patent application No. 201410108320.9 filed on Mar. 21, 2014, which are incorporated herein by reference in their entireties.

TECHNICAL FIELD

The present disclosure relates to the field of display technology, in particular to a display panel and a display device.

BACKGROUND

As the liquid crystal display technology matures, a liquid crystal display device available in the market has gradually developed in a large-size direction. However, at a technical level, a large-sized display panel needs to overcome limitations of a viewing angle. Hence, a wide-viewing-angle liquid crystal display technology has been proposed.

Currently, depending on their display modes, liquid crystal panels may include a twisted nematic (TN) type one, an in-plane switching (IPS) type one, and an advanced super dimension switch (ADS) type one. For the liquid crystal panel with the ADS display mode, a multi-dimensional electric field is formed by means of electrical fields generated at edges of electrodes within an identical plane and an electrical field generated between an electrode layer and a plate electrode layer, so as to enable all the liquid crystal molecules between the electrodes and right above the electrodes to rotate. As compared with the liquid crystal panel with the IPS display mode, the liquid crystal panel with the ADS display mode can improve the operational efficiency of the liquid crystal molecules and enhance the light transmission efficiency. The liquid crystal panel with the ADS display mode has such advantages as high image quality, high resolution, high transmittance, low power consumption, wide viewing angle, high aperture ratio, low chromatic aberration and being free of push Mura.

FIG. 1 is a schematic view showing an arrangement mode of electrodes at an identical electrode layer in an existing display panel with the ADS display mode. Two auxiliary regions 1 and 2 are defined in a pixel region, and electrodes 70 parallel to each other are arranged in the auxiliary regions 1 and 2, respectively. An angle between the electrodes 70 in the auxiliary region 1 and the electrodes 70 in the auxiliary region 2 is 90°, and all the electrodes 70 extend in their own directions. An electric field El perpendicular to the electrodes 70 is generated by means of a voltage between the electrodes 7, so as to excite liquid crystal molecules 21.

In order to prevent refractive index anisotropy of a liquid crystal layer and a liquid crystal thickness from being varied along with a tilted viewing angle, usually there is an angle of 90° between an initial alignment direction of the liquid crystal molecules 21 in the auxiliary region 1 and that in the auxiliary region 2. When a voltage is applied to the liquid crystal display device, the liquid crystal molecules 21 rotate in an identical direction, and after the rotation, the angle between the alignment directions is still maintained, as shown in FIG. 2.

However, in the coplanar liquid crystal display device with the structure as shown in FIG. 1, before applying a deflection voltage, the liquid crystal molecules in the liquid crystal layer are in the initial alignment directions under action of an alignment film attached onto the display device, respectively. There is an angle of 90° between the initial alignment direction of the liquid crystal molecules in the auxiliary region 1 and that in the auxiliary region 2. However, as shown in FIG. 2, the liquid crystal molecules at a boundary between the auxiliary regions 1 and 2 are affected by the alignment films corresponding to the auxiliary regions 1, 2 and aligned at different angles, so the alignment directions of the liquid crystal molecules at the boundary are uncertain. When in transition from the alignment direction in the auxiliary region 1 to the alignment direction in the auxiliary region 2 at the boundary, the liquid crystal molecules at the boundary may rotate in different directions. Hence, a "disclination point" (shown by "x" in FIG. 3) is generated at the boundary as shown in FIG. 3, which results in uneven display brightness and the occurrence of Mura. Especially, when the "disclination points" are located at special positions or distributed unevenly, the brightness of the display device will be affected in a more apparent manner.

SUMMARY

An object of technical solutions of the present disclosure is to provide a display panel and a display device, so as to prevent the occurrence of "disclination points" at a predetermined display region of the display device.

The present disclosure provides a display panel, including a liquid crystal layer and a pixel unit. The pixel unit includes a first sub-unit region and a second sub-unit region. Liquid crystal molecules in the liquid crystal layer corresponding to the first sub-unit region have a first initial alignment direction. Liquid crystal molecules in the liquid crystal layer corresponding to the second sub-unit region have a second initial alignment direction. The pixel unit further includes a third sub-unit region arranged between the first sub-unit region and the second sub-unit region. Liquid crystal molecules in the liquid crystal layer corresponding to the third sub-unit region have a third initial alignment direction, which is an alignment direction in a rotation from the first initial alignment direction towards the second initial alignment direction along a first rotation direction. An angle difference between the first initial alignment direction and the second initial alignment direction is greater than 0° and less than or equal to 90°.

Further, the display panel includes a first substrate and a second substrate. The liquid crystal layer is arranged between the first substrate and the second substrate; the pixel unit is formed on the first or second substrate.

Further, in the above display panel, the third sub-unit region includes a first boundary which divides the first sub-unit region from the third sub-unit region, and a second boundary which divides the second sub-unit region from the third sub-unit region.

At the third sub-unit region, from the first boundary to the second boundary, liquid crystal molecules corresponding to regions with different distances to the first boundary have third initial alignment directions; the third initial alignment directions are changed in a manner of rotation from the first initial alignment direction towards the second initial alignment direction along the first rotation direction.

Further, in the above display panel, the third sub-unit region includes a first portion and a second portion. The first portion of the third sub-unit region is arranged adjacent to the first sub-unit region. The second portion of the third sub-unit region is arranged adjacent to the second sub-unit region. The display panel further includes an alignment film arranged at each of two sides of the liquid crystal layer. The alignment film includes a first alignment region and a second alignment region. The first alignment region corresponds to a combined region composed of the first sub-unit region and the first portion of the third sub-unit region. The second alignment region corresponds to a combined region composed of the second sub-unit region and the second portion of the third sub-unit region. The first alignment region has a first rubbing direction, the second alignment region has a second rubbing direction, and an angle between the first rubbing direction and the second rubbing direction is greater than 0° and less than 90°.

Further, in the above display panel, an acute angle between the first rubbing direction and the second rubbing direction is greater than 88°.

Further, in the above display panel, an angle between the first rubbing direction and a horizontal direction is 89.8°, and an angle between the second rubbing direction and the horizontal direction is 0.2°.

Further, in the above display panel, the display panel includes an alignment film arranged at each of two sides of the liquid crystal layer. The alignment film includes a first alignment region, a second alignment region and a third alignment region arranged between the first alignment region and the second alignment region. The first alignment region has a first rubbing direction, the second alignment region has a second rubbing direction, and the third alignment region has a third rubbing direction different from the first and second rubbing directions. The first alignment region corresponds to the first sub-unit region; the second alignment region corresponds to the second sub-unit region; the third alignment region corresponds to the third sub-unit region.

Further, in the above display panel, an angle between the first rubbing direction and the second rubbing direction is 90°.

Further, in the above display panel, an angle between the third rubbing direction and the first or second rubbing direction is 45°.

Further, in the above display panel, the display panel includes an alignment film, a first electrode region, a second electrode region, and a third electrode region. The alignment film is arranged at each of two sides of the liquid crystal layer. The alignment film includes a first alignment region having a first rubbing direction and a second alignment region having a second rubbing direction. A plurality of first electrodes arranged parallel to each other and having a first extension direction is arranged at the first electrode region. A plurality of second electrodes arranged parallel to each other and having a second extension direction different from the first extension direction is arranged at the second electrode region. A plurality of third electrodes arranged parallel to each other and having a third extension direction is arranged at the third electrode region. The third electrode region is arranged between the first electrode region and the second electrode region.

The first alignment region corresponds to the first electrode region, and the second alignment region corresponds to a combined region composed of the second electrode region and the third electrode region. The first electrode region includes a first portion, and a second portion. The second portion of the first electrode region is arranged adjacent to the third electrode region. The first sub-unit region corresponds to the first portion of the first electrode region, the third sub-unit region corresponds to a combined region composed of the third electrode region and the second portion of the first electrode region, and the second sub-unit region corresponds to the second electrode region.

Further, in the above display panel, an angle between the first rubbing direction and the second rubbing direction is 90°, an angle between the first extension direction and the second extension direction is 90°, the first extension direction is identical to the third extension direction, an acute angle between the first rubbing direction and the first extension direction is 3° to 25°, and an acute angle between the second rubbing direction and the second extension direction is 3° to 25°.

Further, in the above display panel, an angle between the first rubbing direction and the second rubbing direction is 90°, an angle between the first extension direction and the second extension direction is 90°, the third extension direction is different from the first extension direction, an acute angle between the first rubbing direction and the first extension direction is 3° to 25°, and an acute angle between the second rubbing direction and the second extension direction is 3° to 25°.

Further, in the above display panel, an acute angle between the third extension direction and a horizontal direction is less than an acute angle between the first extension direction and the horizontal direction.

Further, in the above display panel, an acute angle between the third extension direction and the first extension direction is greater than 0° and less than or equal to 45°.

The present disclosure further provides a display device including the above-mentioned display panel.

At least one of the above technical solutions of the embodiments of the present disclosure has the following beneficial effects.

The liquid crystal molecules corresponding to the third sub-unit region between the first sub-unit region and the second sub-unit region have the third initial alignment direction, which is an alignment direction in a rotation from the first initial alignment direction towards the second initial alignment direction along the first rotation direction. As a result, it is able to provide a uniform alignment direction, thereby to prevent the occurrence of disclination points at the predetermined region.

In addition, the angle difference between the first initial alignment direction and the second initial alignment direction is less than 90°, and under action of the alignment film, the liquid crystal molecules at the boundary between the first sub-unit region and the second sub-unit region are aligned in one identical rotation mode. As a result, it is able to prevent the occurrence of the disclination points at the predetermined region, thereby to prevent the uneven display brightness of the display device due to the occurrence of the disclination points in the related art.

DETAILED DESCRIPTION

In order to make the objects, the technical solutions and the advantages of the present disclosure more apparent, the present disclosure will be described hereinafter in conjunction with the drawings and embodiments.

A display panel in one embodiment of the present disclosure includes a first substrate, a second substrate and a liquid crystal layer arranged between the first substrate and the second substrate. A pixel unit is formed on the first substrate or the second substrate. The pixel unit includes a first sub-unit region and a second sub-unit region. Liquid crystal molecules in the liquid crystal layer corresponding to the first sub-unit region have a first initial alignment direction. Liquid crystal molecules in the liquid crystal layer corresponding to the second sub-unit region have a second initial alignment direction. The pixel unit further includes a third sub-unit region arranged between the first sub-unit region and the second sub-unit region. Liquid crystal molecules in the liquid crystal layer corresponding to the third sub-unit region have a third initial alignment direction. The third initial alignment direction is an alignment direction in a rotation from the first initial alignment direction towards the second initial alignment direction along a first rotation direction. An angle difference between the first initial alignment direction and the second initial alignment direction is greater than 0° and less than or equal to 90°.

Figure 1:
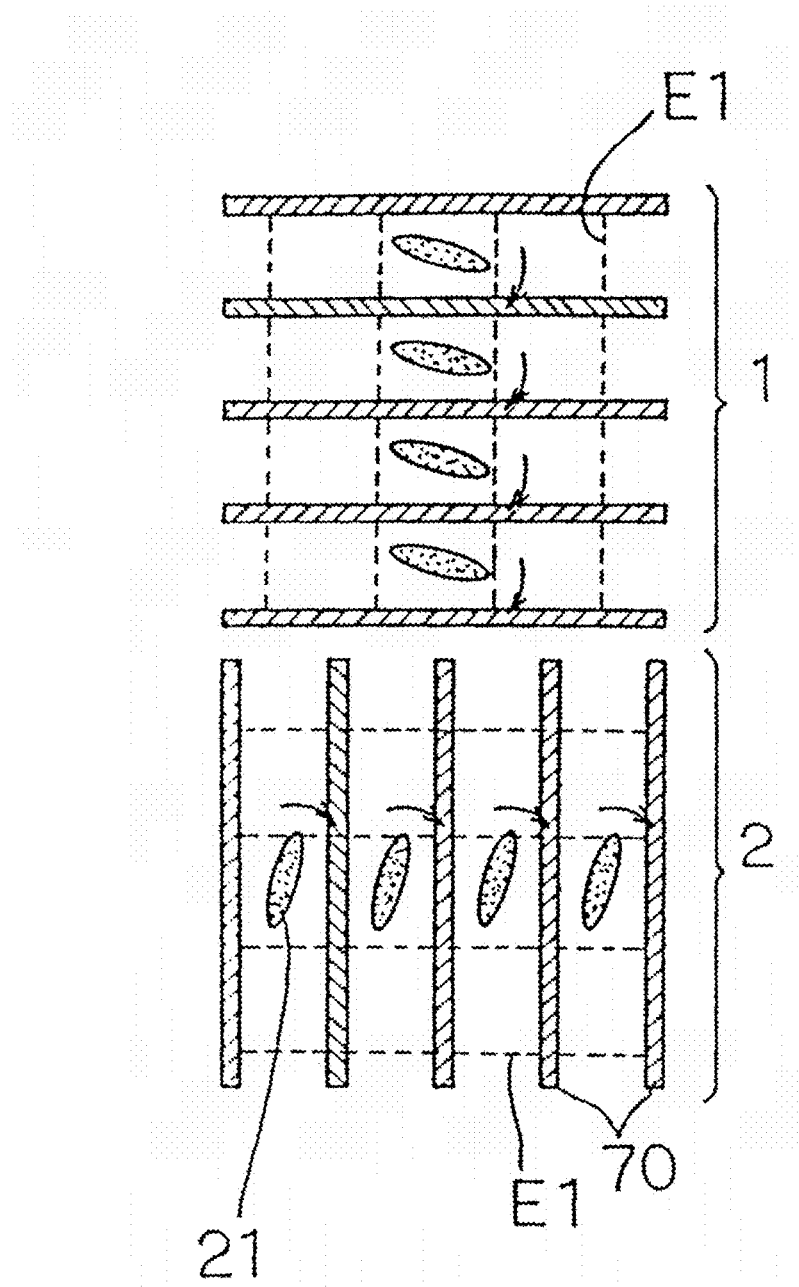
FIG. 1 is a schematic view showing an arrangement mode of electrodes at an identical electrode layer in an existing display panel with an ADS display mode.
Figure 2:
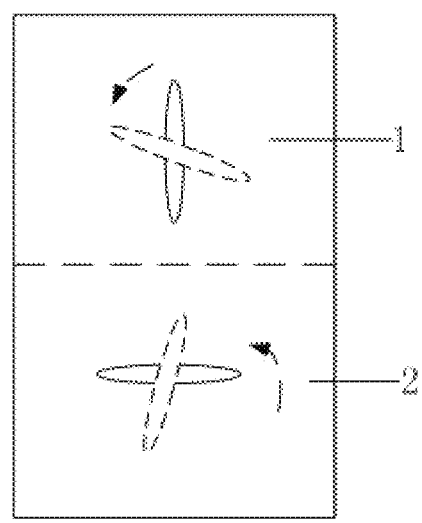
FIG. 2 is a schematic view showing state changes of liquid crystal molecules when a conventional ADS liquid crystal display device is powered.
Figure 3:
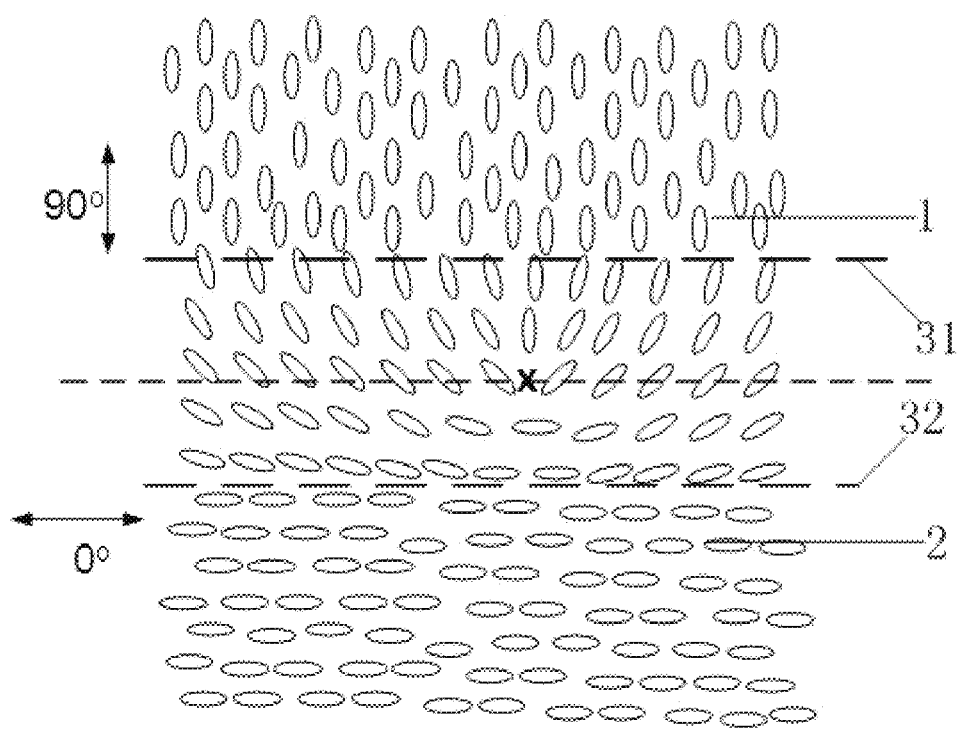
FIG. 3 is a schematic view showing formation of a disclination point in the conventional liquid crystal display device.
Figure 4:
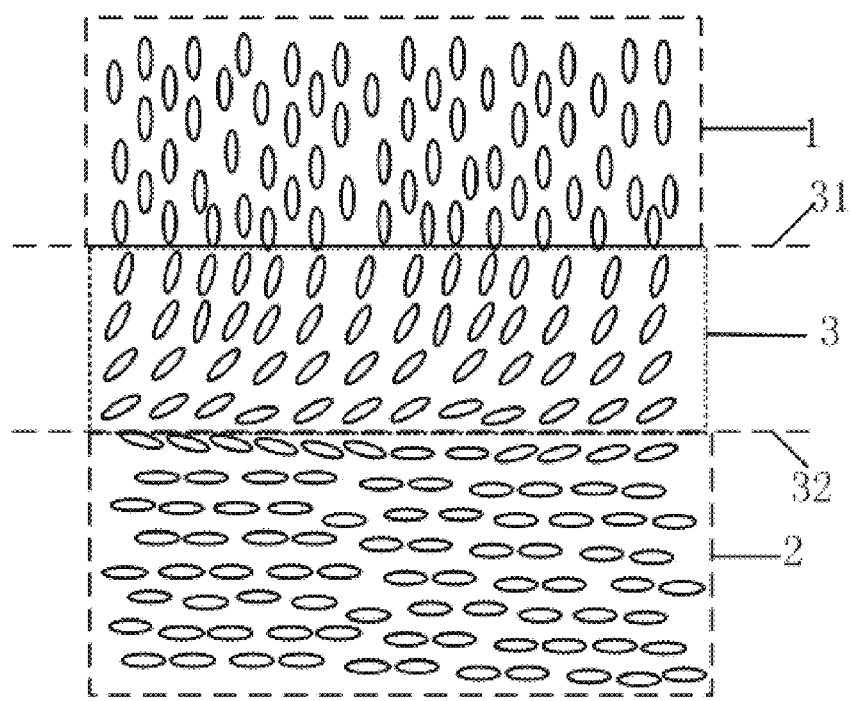
FIG. 4 is a schematic view showing a state of liquid crystal molecules for a pixel structure formed in a display panel according to one embodiment of the present disclosure.

As shown in FIG. 4, in the display panel of the present disclosure, the liquid crystal molecules in the liquid crystal layer corresponding to the third sub-unit region 3 between the first sub-unit region 1 and the second sub-unit region 2 have the third initial alignment direction, which is an alignment direction in a rotation from the first initial alignment direction towards the second initial alignment direction along the first rotation direction. In the present disclosure, the angle difference between the first initial alignment direction and the second initial alignment direction is greater than 0° and less than or equal to 90°. The first initial alignment direction is usually perpendicular to the second initial alignment direction. For example, when the second initial alignment direction is a horizontal direction, i.e., 0°, the first initial alignment direction is 90° ; at this time, the third initial alignment direction may be an alignment direction in a rotation from a 90° direction to a 0° direction along a clockwise direction, or may also be an alignment direction in a rotation from the 90° direction to the 0° direction along a counter-clockwise direction, and then a uniform rubbing direction is provided to prevent the occurrence of disclination points at a predetermined region.

In the embodiments of the present disclosure, the term "initial alignment direction" refers to a rubbing direction of the liquid crystal molecules when unpowered. In addition, the first rotation direction is a clockwise direction or a counter-clockwise direction, that is, the first rotation direction can only be one of the clockwise direction or the counter-clockwise direction.

Specifically, the liquid crystal molecules at the third sub-unit region 3 may have different rubbing directions, as shown in FIG. 4. The third sub-unit region 3 includes a first boundary 31 which divides the first sub-unit region 1 from the third sub-unit region 3, and a second boundary 32 which divides the second sub-unit region 2 from the third sub-unit region 3. At the third sub-unit region 3, the third initial alignment directions of the liquid crystal molecules corresponding to regions with different distances to the first boundary 31 are different from each other. For example, from the first boundary 31 to the second boundary 32, the third initial alignment directions are gradually changed in a manner of rotation from the first initial alignment direction towards the second initial alignment direction along the first rotation direction.

The "first boundary 31" and the "second boundary 32" refer to the boundary for distinguishing the first sub-unit region 1 from the third sub-unit region 3 and the boundary for distinguishing the second sub-unit 2 from the third sub-unit region 3, respectively. In other words, the liquid crystal molecules at two sides of each of the first boundary 31 and the second boundary 32 have different initial alignment directions. At the third sub-unit region 3, the initial alignment direction of the liquid crystal molecules at the first boundary 31 is changed relatively to the initial alignment direction of the liquid crystal molecules at the first sub-unit region 1. At the third sub-unit region 3, the initial alignment direction of the liquid crystal molecules at the second boundary 32 is changed relatively to initial alignment direction of the liquid crystal molecules at the second sub-unit region 2. At the third sub-unit region 3, from the first boundary 31 to the second boundary 32, the third initial alignment directions of the liquid crystal molecules are changed along with different distances to the first boundary 31, e.g., the third initial alignment directions are gradually changed in a manner of rotation from the first initial alignment direction towards the second initial alignment direction along the first rotation direction. In other words, the third initial alignment direction at the first boundary 31 is approximate to the first initial alignment direction, while the third initial alignment direction at the second boundary 32 is approximate to the second alignment direction. For example, referring to FIG. 4, at the third sub-unit region 3, from the first boundary 31 to the second boundary 32, the third initial alignment directions of the liquid crystal molecules are gradually changed from a state approximate to the first initial alignment direction to a state approximate to the second initial alignment direction, and acute angles defined between the third initial alignment directions and the second initial alignment direction are decreased gradually.

In the present disclosure, the so-called "alignment direction" of a liquid crystal molecule refers to a direction of a long axis of the liquid crystal molecule. The display panel of the present disclosure will be described hereinafter in conjunction with the following embodiments.

First Embodiment

Figure 5:
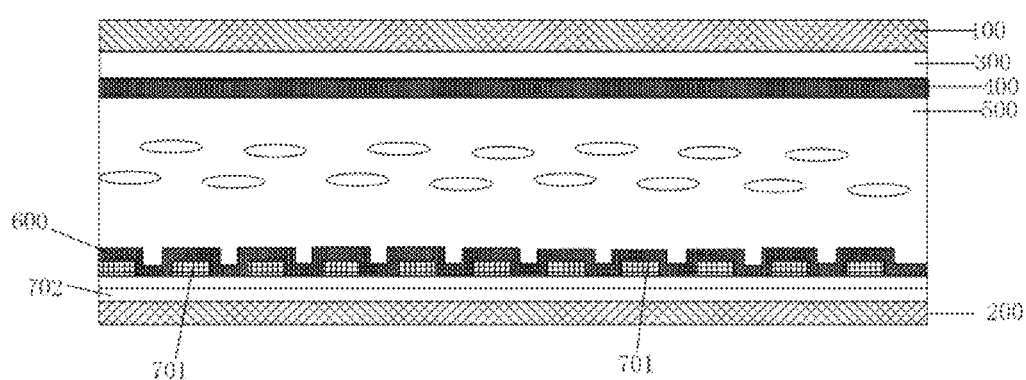
FIG. 5 is a schematic view showing the display panel according to one embodiment of the present disclosure.

FIG. 5 is a schematic view showing the display panel according to the first embodiment of the present disclosure. The display panel includes a first substrate 100, a second substrate 200, and a color filter film 300, a first alignment film 400, a liquid crystal layer 500 and a second alignment film 600 arranged sequentially between the first substrate 100 and the second substrate 200. A first electrode layer 701 and a second electrode layer 702 are arranged on the second substrate 200. An insulating layer is arranged between the first electrode layer 701 and the second electrode layer 702. The first electrode layer 701 is composed of a plurality of bar-like electrodes.

Figure 6:
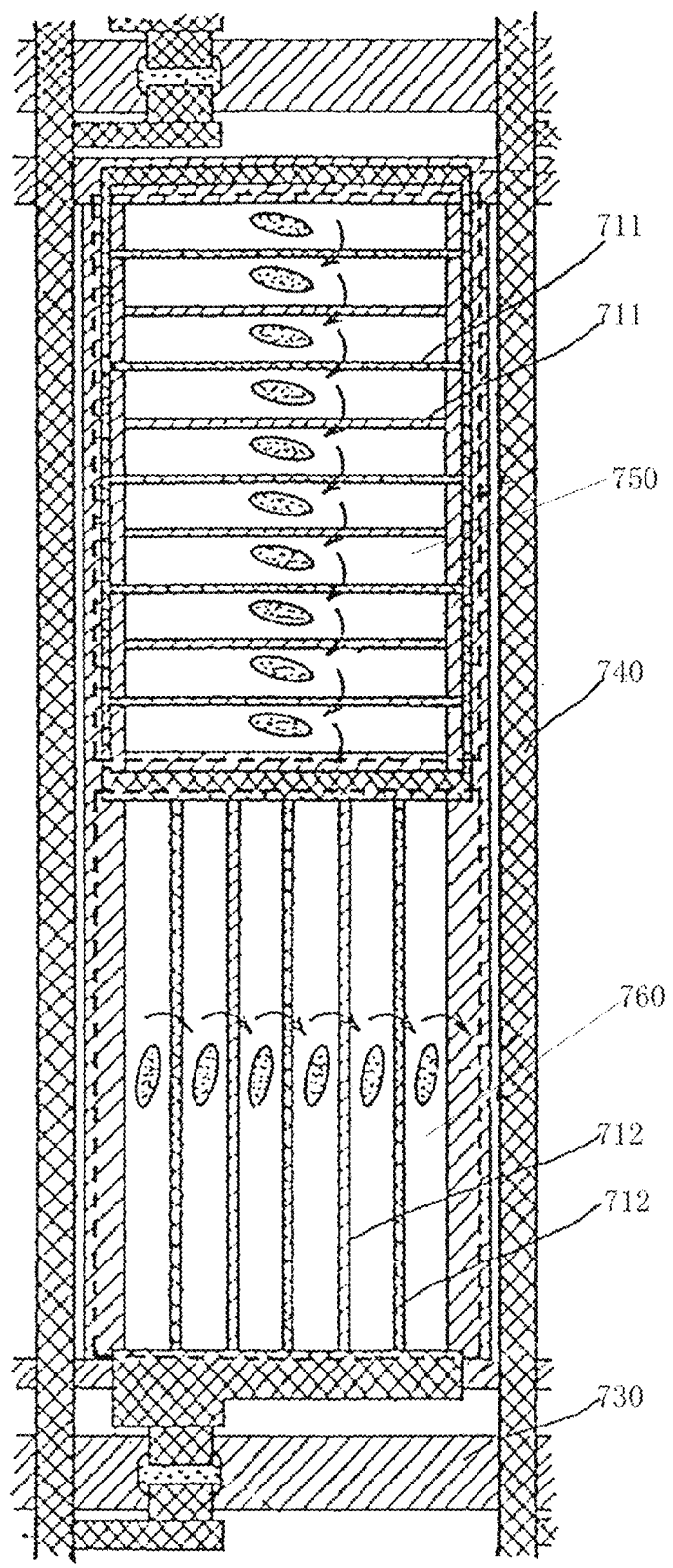
FIG. 6 is a planar view showing a pixel unit in the display panel according to one embodiment of the present disclosure.

In addition, a plurality of gate lines parallel to each other and a plurality of data lines parallel to each other are further arranged on the second substrate 200. The gate lines and the data lines intersect each other so as to define a plurality of pixel units. As shown in FIG. 6, each pixel unit is defined by two parallel gate lines 730 and two parallel data lines 740. Each pixel unit includes two sub-units. Each sub-unit corresponds to an electrode region, e.g., a first electrode region 750 or a second electrode region 760. Bar-like first electrodes 711 are provided in the first electrode region 750. The first electrodes 711 are parallel to each other and have a first extension direction. Bar-like second electrodes 712 are provided in the second electrode region 760. The second electrodes 712 are parallel to each other and have a second extension direction. The second extension direction is perpendicular to the first extension direction.

Figure 7:
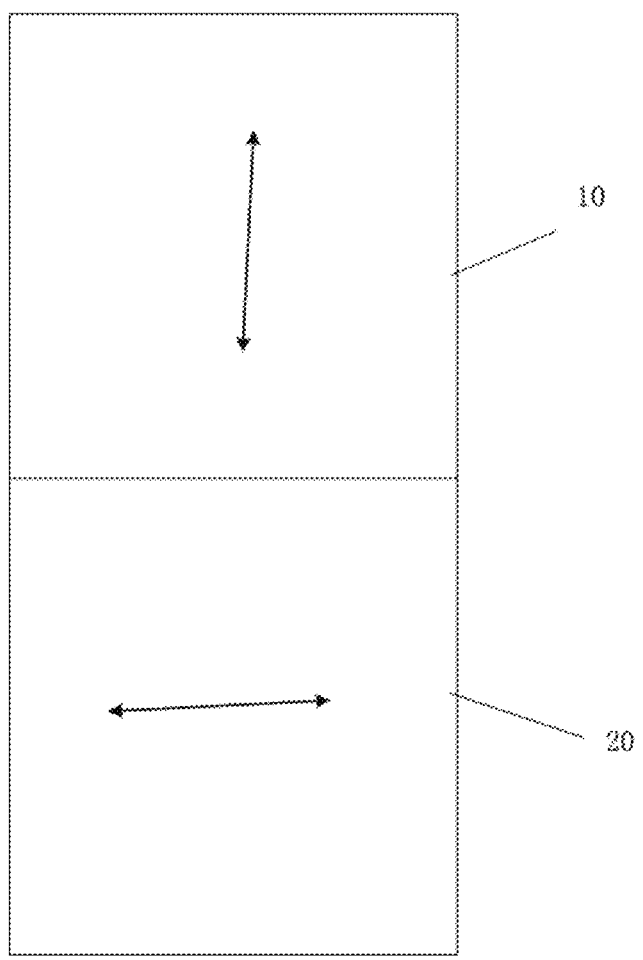
FIG. 7 is a schematic view showing alignment directions of an alignment film in the display panel according to a first embodiment of the present disclosure.

The first alignment film 400 and the second alignment film 600 on the liquid crystal layer 500 are subjected to surface treatment, so as to align the liquid crystal molecules in the liquid crystal layer 500 when no electric field is applied to the liquid crystal molecules in the liquid crystal layer 500. Structures of each of the first alignment film 400 and the second alignment film 600 are as shown in FIG. 7. The first alignment film 400 and the second alignment film 600 each include a first alignment region 10 and a second alignment region 20. The first alignment region 10 has a first rubbing direction and the second alignment region 20 has a second rubbing direction.

Figure 8:
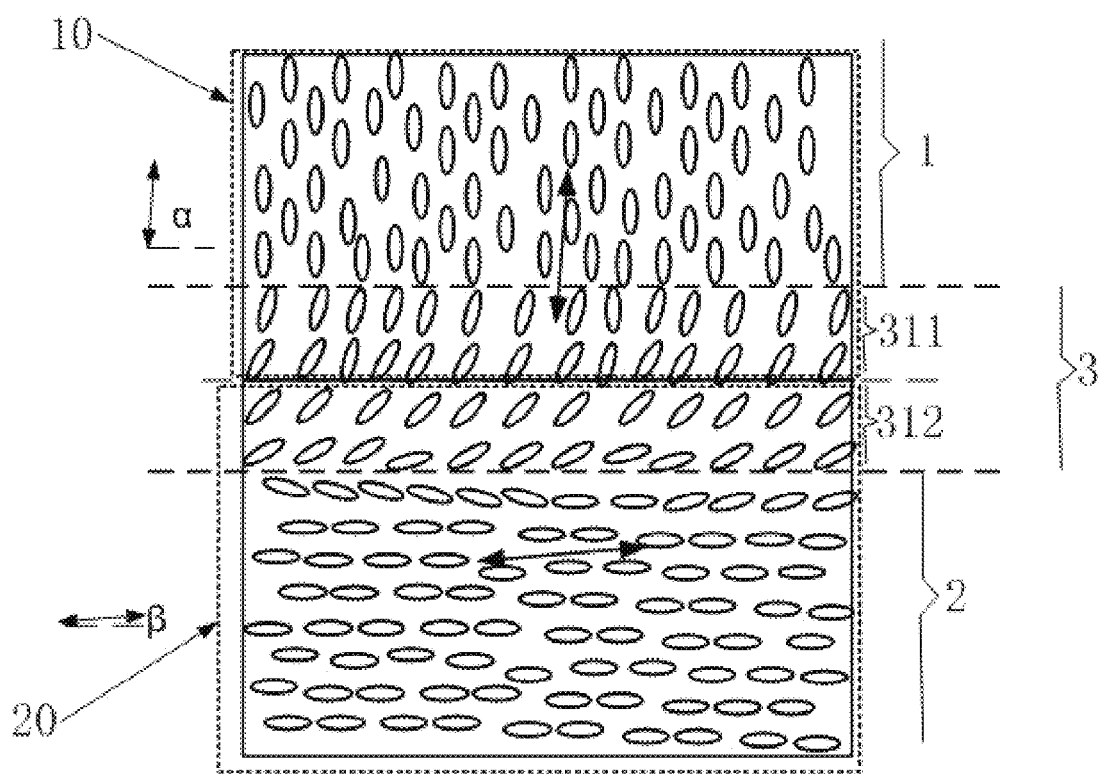
FIG. 8 is a schematic view showing relationship between the rubbing directions of the alignment film and three sub-unit regions in the display panel according to the first embodiment of the present disclosure.

Referring to FIG. 8, the third sub-unit region 3 includes a first portion 311 and a second portion 312. The first portion 311 is a portion adjacent to the first sub-unit region 1. The second portion 312 is a portion adjacent to the second sub-unit region 2. Apart from a portion corresponding to the first sub-unit region 1, the first alignment region 10 further includes a portion corresponding to the first portion 311 of the third sub-unit region 3. Apart from a portion corresponding to the second sub-unit region 2, the second alignment region 20 further includes a portion corresponding to the second portion 312 of the third sub-unit region 3.

In addition, the first alignment region 10 has the first rubbing direction which causes the liquid crystal molecules corresponding to the first sub-unit region 1 to have the first initial alignment direction when no electric field is applied. The second alignment region 20 has the second rubbing direction which causes the liquid crystal molecules corresponding to the second sub-unit region 2 to have the second initial alignment direction when no electric field is applied. It should be appreciated that, the initial alignment direction of the liquid crystal molecules in the liquid crystal layer depends on the rubbing direction of the alignment film. Generally, the initial alignment direction corresponds to the rubbing direction of the alignment film. When the rubbing direction of the alignment film is a 90° direction, the initial alignment direction of the aligned liquid crystal molecules is a 90° direction; and when the rubbing direction of the alignment film is a 0° direction, the initial alignment direction of the aligned liquid crystal molecules is a 0° direction. Hence, the first initial alignment direction of the liquid crystal layer 500 at the first sub-unit region 1 is equal to the first rubbing direction of the first alignment region 10, and the second initial alignment direction of the liquid crystal layer 500 at the second sub-unit region 2 is equal to the second rubbing direction of the second alignment region 20.

Hence, the first initial alignment direction is identical to the first rubbing direction, and the second initial alignment direction is identical to the second rubbing direction.

In the display panel of the first embodiment of the present disclosure, in order to prevent the occurrence of disclination points between the first sub-unit region 1 and the second sub-unit region 2, an angle between the first rubbing direction and the second rubbing direction is greater than 0° and less than 90°. Alternatively, an angle difference between the first rubbing direction and the second rubbing direction is greater than 88°. Based on the above arrangement mode of the alignment films, in the aligned liquid crystal layer 500, an angle difference between the initial alignment directions of the liquid crystal molecules corresponding to the two sub-unit regions of the pixel unit is less than 90°, which may achieve the effect of preventing the occurrence of the disclination points at a predetermined region between the two sub-unit regions.

Figure 9:
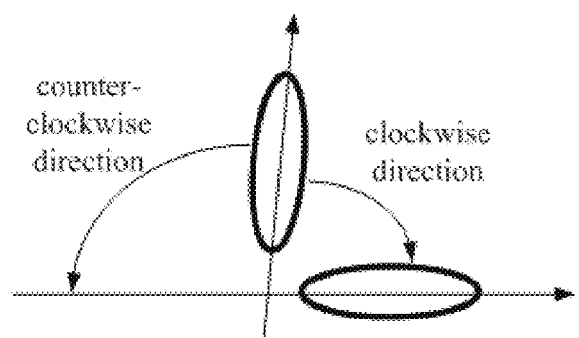
FIG. 9 is a schematic view showing a principle according to which liquid crystal molecules between the two sub-unit regions are aligned in the display panel according to the first embodiment of the present disclosure.

In conjunction with states of the liquid crystal molecules shown in FIG. 8, in the display panel of the first embodiment of the present disclosure, since the angle between the first rubbing direction and the second rubbing direction is greater than 0° and less than 90°, thus, an angle between the first initial alignment direction and the second initial alignment direction is also greater than 0° and less than 90°. Optionally, an acute angle between the first rubbing direction and the second rubbing direction is greater than 88°. Specifically, an angle between the first rubbing direction and a horizontal direction is 89.8°, and an angle between the second rubbing direction and the horizontal direction is 0.2°. Correspondingly, an angle a between the first initial alignment direction and the horizontal direction is 89.8°, while an angle β between the second initial alignment direction and the horizontal direction is 0.2°. Based on the above values of the alignment angles, when the liquid crystal molecules at the boundary between the first sub-unit region 1 and the second sub-unit region 2 are rotated from the first initial alignment direction to the second initial alignment direction under action of the alignment film along the first rotation direction such as the clockwise direction as shown in FIG. 9, angel changes experienced by the liquid crystal molecules at the boundary between the first sub-unit region 1 and the second sub-unit region 2 are from 89.8° to 80°, from 80° to 70°, . . . from 10° to 0.2°, and the liquid crystal molecules at the boundary between the first sub-unit region 1 and the second sub-unit region 2 need to rotate by 89.6°. While when the liquid crystal molecules at the boundary between the first sub-unit region 1 and the second sub-unit region 2 are rotated from the first initial alignment direction to the second initial alignment direction under action of the alignment film along the second rotation direction such as the counter-clockwise direction as shown in FIG. 9, angel changes experienced by the liquid crystal molecules at the boundary between the first sub-unit region 1 and the second sub-unit region 2 are from 89.8° to 100°, from 100° to 110°, . . . to 180.2° (equivalent to)0.2°, and the liquid crystal molecules at the boundary between the first sub-unit region 1 and the second sub-unit region 2 need to rotate by 90.4°. A rotation angle for the first rotation mode is less than a rotation angle for the second rotation mode, and the first rotation mode requires relatively smaller energy and forms a stable boundary, thus, in this case, a probability of the occurrence of the first rotation mode is far greater than a probability of the occurrence of the second rotation mode, so that the liquid crystal molecules at the boundary between the first sub-unit region 1 and the second sub-unit region 2 are aligned through one identical rotation mode, thereby to prevent the occurrence of the disclination points at the predetermined region.

Based on the above, in the display panel of the first embodiment of the present disclosure, when unpowered, the initial alignment directions of the liquid crystal molecules in the first sub-unit region 1 and the second sub-unit region 2 are of forms shown in FIG. 8, and an angle difference between α and β is less than 90°. Since the first initial alignment direction is identical to the first rubbing direction of the first alignment region 10 of the alignment film and the second initial alignment direction is identical to the second rubbing direction of the second alignment region 20 of the alignment film, thus, the acute angle between the first rubbing direction and the second rubbing direction is greater than 0° and less than 90°. Optimally, the acute angle between the first rubbing direction and the second rubbing direction is greater than 88°.

Based on the above, the third initial alignment direction of the liquid crystal molecules at the third sub-unit region 3 is different from the first initial alignment direction and the second initial alignment direction, and an angle difference between the third initial alignment direction and the first initial alignment direction or the second initial alignment direction is less than 90° and greater than 0°.

In addition, since the first portion 311 of the third sub-unit region 3 corresponds to the first alignment region 10 of the alignment film, and the second portion 312 corresponds to the second alignment region 20 of the alignment film, thus the liquid crystal molecules corresponding to the third sub-unit region 3 have third initial alignment directions under coactions of the first rubbing direction and the second rubbing direction of the alignment film. From the first boundary 31 of the first sub-unit region 1 to the second boundary 32 of the second sub-unit region 2, the third initial alignment directions are gradually changed in a manner of rotation from the first initial alignment direction towards the second initial alignment direction along the first rotation direction.

In other words, when the first alignment direction has an extension direction which is deflected towards one direction by a first angle relative to a first standard alignment direction (90°), the second initial alignment direction has an extension direction which is deflected towards an opposite direction by a second angle relative to a second standard alignment direction(0°). Each of the first angle and the second angle is less than 1°. The first standard alignment direction is perpendicular to the second standard alignment direction. Thus, adoption of the above structure of the present disclosure causes the liquid crystal molecules in one pixel structure of the liquid crystal layer to be in the state shown in FIG. 4. Under action of the alignment film, the liquid crystal molecules at the boundary between the first sub-unit region 1 and the second sub-unit region 2 are rotated along one direction to be aligned, so as to prevent the occurrence of the disclination points at the predetermined region.

Through the above-mentioned arrangement mode, the angle difference between the rubbing directions of the first alignment region 10 and the second alignment region 20 in each of the first alignment film 400 and the second alignment film 600 is less than 90° and greater than or equal to 88°; the liquid crystal molecules of the liquid crystal layer 500 at the third sub-unit region 3 are aligned in one identical rotation mode under action of the rubbing directions of the first alignment region 10 and the second alignment region 20, to prevent the occurrence of the disclination points at the predetermined region, e.g., the third sub-unit region 3, thereby to prevent the uneven display brightness of the display device due to the disclination points in the related art.

In addition, it should be further appreciated that, usually the alignment film functions as to initially align the liquid crystal molecules in accordance with its rubbing direction. However, in the actual application, there may be a certain deviation between the initial alignment direction of the liquid crystal molecules and the rubbing direction due to various factors. Hence, in the above and the follow embodiments of the present disclosure, the initial alignment direction identical to the rubbing direction means that the initial alignment direction is approximately identical to the rubbing direction, and a certain deviation therebetween is permitted.

Second Embodiment

The display panel in the second embodiment of the present disclosure is provided so as to further prevent the occurrence of the disclination points at a predetermined region between two sub-unit regions.

Similar to the first embodiment, as shown in FIG. 5, the display panel in the second embodiment includes the first substrate 100, the second substrate 200, and the color filter film 300, the first alignment film 400, the liquid crystal layer 500 and the second alignment film 600 sequentially arranged between the first substrate 100 and the second substrate 200.

Figure 10:
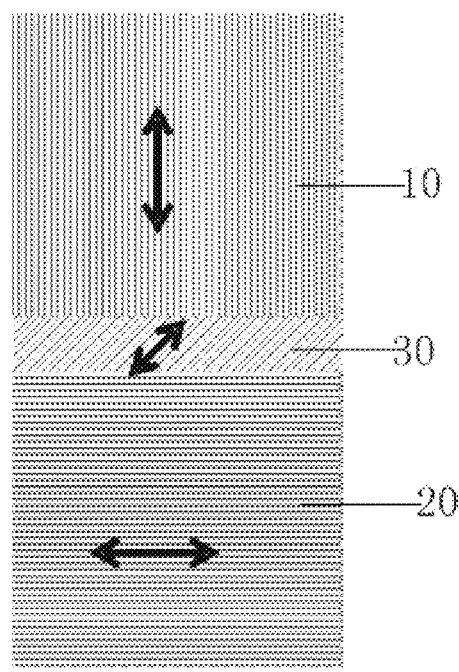
FIG. 10 is a schematic view showing alignment directions of an alignment film in a display panel according to a second embodiment of the present disclosure.

Referring to FIG. 10, the first alignment film 400 and the second alignment film 600 each include the first alignment region 10 corresponding to the first sub-unit region 1 and the second alignment region 20 corresponding to the second sub-unit region 2. The first alignment region 10 has a first rubbing direction which causes the liquid crystal molecules corresponding to the first sub-unit region 1 to be aligned in the first initial alignment direction when no electric field is applied. The second alignment region 20 has a second rubbing direction which causes the liquid crystal molecules corresponding to the second sub-unit region 2 to be aligned in the second initial alignment direction when no electric field is applied.

Specifically, the first alignment film 400 and the second alignment film 600 are used to initially align the corresponding liquid crystal molecules in accordance with their rubbing directions. The first initial alignment direction at the first sub-unit region 1 is equal to the first rubbing direction of the first alignment region 10, and the second initial alignment direction at the second sub-unit region 2 is equal to the second rubbing direction of the second alignment region 20. Alternatively, an angle between the first rubbing direction and the second rubbing direction is equal to 90°.

In the second embodiment of the present disclosure, the first alignment film 400 and the second alignment 600 each further include a third alignment region 30. The third alignment region 30 is arranged between the first alignment region 10 and the second alignment region 20 and corresponding to the third sub-unit region 3. The third alignment region 30 has a third rubbing direction which causes the liquid crystal molecules corresponding to the third sub-unit region 3 to be aligned in the third initial alignment direction when no electric field is applied. The third rubbing direction is different from the first rubbing direction and the second rubbing direction. The third initial alignment direction is an alignment direction in a rotation from the first initial alignment direction towards the second initial alignment direction along a first rotation direction. In this way, through the improvement in the rubbing direction of the alignment region of the alignment film, the liquid crystal molecules at the third sub-unit region 3 have the initial alignment directions as shown in FIG. 4, thereby to prevent the occurrence of the disclination points.

In the second embodiment of the present disclosure, when an angle between the first rubbing direction and the horizontal direction is 90° and an angle between the second rubbing direction and the horizontal direction is 0°, the third rubbing direction may be a direction in a rotation from a 0° direction to a 90° direction along a clockwise or counterclockwise direction. For example, an angle between the third rubbing direction and the horizontal direction may be 45° or −45°, i.e., an angle between the third rubbing direction and the first or second rubbing direction is 45°.

In the second embodiment of the present disclosure, a region of each of the first alignment film 400 and the second alignment film 600 corresponding to the third sub-unit region 3 at the boundary between the first sub-unit region 1 and the second sub-unit region 2 is subjected to the alignment treatment in a specific direction, so as to evenly align the liquid crystal molecules at the region of the liquid crystal layer 500, i.e., the third sub-unit region 3 at the boundary between the first sub-unit region 1 and the second sub-unit region 2, thereby to further prevent the occurrence of the disclination points.

Of course, in the second embodiment, the rubbing directions of the first alignment region 10 and the second alignment region 20 for the first alignment film 400 and the second alignment film 600 may be set in conjunction with the structure mentioned in the first embodiments, i.e., an angle difference between the first rubbing direction and the second rubbing direction may be less than 90° and greater than 88°. For example, an angle between the first rubbing direction and the horizontal direction is 89.8° and an angle between the second rubbing direction and the horizontal direction is 0.2°, so as to prevent the occurrence of the disclination points at the predetermined region in a more effective manner.

According to the display panels mentioned in the first and second embodiments, the structure of the alignment film is improved, so as to prevent the occurrence of the disclination points at the predetermined region at the boundary between two regions when no electric field is applied to the liquid crystal layer. In addition, the arrangement relationship between the alignment film and the electrodes is also improved, so as to further prevent the occurrence of the disclination points at the predetermined region due to the reverse rotation of the liquid crystal molecules when an electric field is or is not applied to the liquid crystal layer.

Third Embodiment

Thus, the third embodiment of the present disclosure further provides a display panel. Similar to the first and second embodiments, referring to FIG. 5, the display panel in the third embodiment includes the first substrate 100, the second substrate 200, and the color filter film 300, the first alignment film 400, the liquid crystal layer 500 and the second alignment film 600 sequentially arranged between the first substrate 100 and the second substrate 200.

Pixel units are formed on the second substrate 200. Each pixel unit includes three regions corresponding to the first sub-unit region 1 where the liquid crystal molecules of the liquid crystal layer 500 have the first initial alignment direction when no electric field is applied, the second sub-unit region 2 where the liquid crystal molecules of the liquid crystal layer 500 have the second initial alignment direction when no electric field is applied, and the third sub-unit region 3 where the liquid crystal molecules of the liquid crystal layer 500 have the third initial alignment direction when no electric field is applied, as shown in FIG. 4.

An angle difference between the first initial alignment direction and the second initial alignment direction may be equal to 90°, or less than 90° and greater than or equal to 88°.

Figure 11:
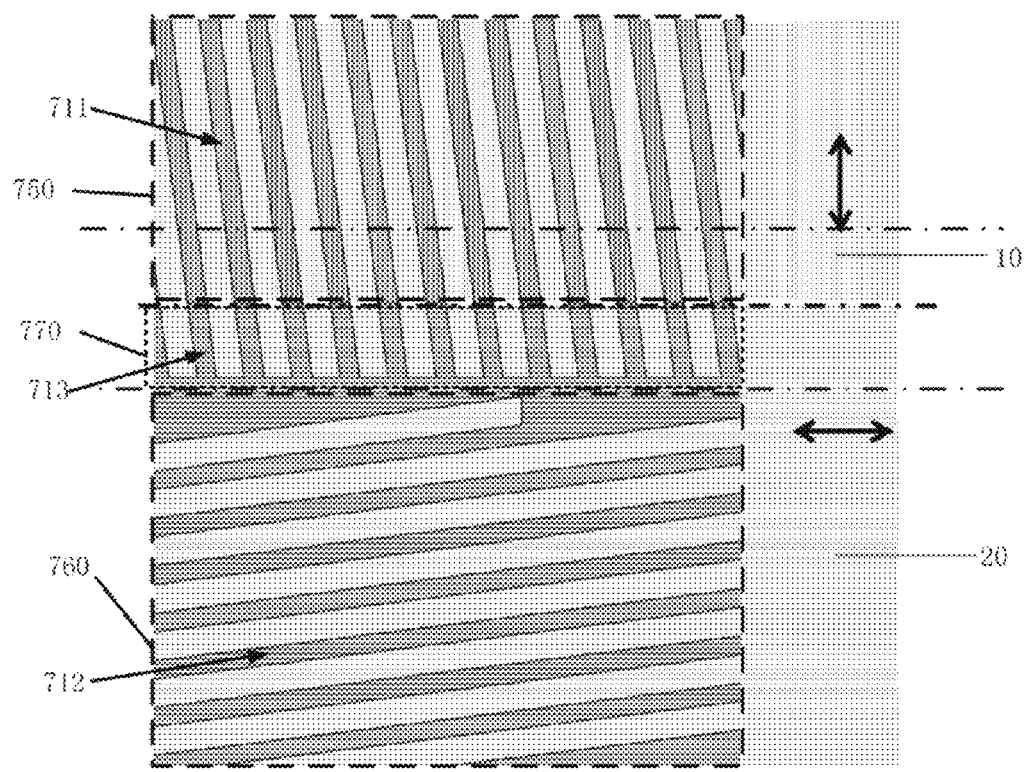
FIG. 11 is a planar view showing corresponding relationship between an alignment film and a pixel unit in a display panel according to a third embodiment of the present disclosure.

In addition, in the third embodiment, the arrangement mode of the electrodes on the second substrate 200 and the rubbing directions of the alignment film are further improved. Referring to FIGS. 11 and 5, the first electrode layer 701 on the first substrate 200 includes a first electrode region 750, a second electrode region 760, and a third electrode region 770.

A plurality of first electrodes 711 arranged parallel to each other and having a first extension direction is arranged in the first electrode region 750. A plurality of second electrodes 712 arranged parallel to each other and having a second extension direction is arranged in the second electrode region 760. A plurality of third electrodes 713 arranged parallel to each other and having a third extension direction is arranged in the third electrode region 770. The third electrode region 770 is arranged between the first electrode region 750 and the second electrode region 760.

In the third embodiment of the present disclosure, the first extension direction is different from the second extension direction, and an acute angle between the first extension direction and the second extension direction is greater than 0° and less than or equal to 90°, and alternatively, 90°. In addition, the third extension direction is identical to the first extension direction, and each of the third electrodes 713 is connected to one first electrode 711. In addition, as shown in FIG. 11, the first electrode 711, the second electrode 712 and the third electrode 713 may be electrically connected to each other or respectively connected to a lead, and corresponding signals are input thereto.

Further, the display panel includes the first alignment film 400 and the second alignment film 600 arranged at two sides of the liquid crystal layer 500. The first alignment film 400 and the second alignment film 600 each include the first alignment region 10 having a first rubbing direction and the second alignment region 20 having a second rubbing direction.

Referring to FIG. 11, in the third embodiment, the first alignment region 10 corresponds to the first electrode region 750, and the second alignment region 20 corresponds to a combined region composed of the second electrode region 760 and the third electrode region 770.

Alternatively, an angle difference between the first rubbing direction and the second rubbing direction is 90°, an acute angle between the first rubbing direction and the first extension direction is 3° to 25°, and an acute angle between the second rubbing direction and the second extension direction is 3° to 25°, so that the liquid crystal molecules may be deflected in a better manner under action of the electric field, thereby to improve the transmittance of the display panel.

Figure 12:
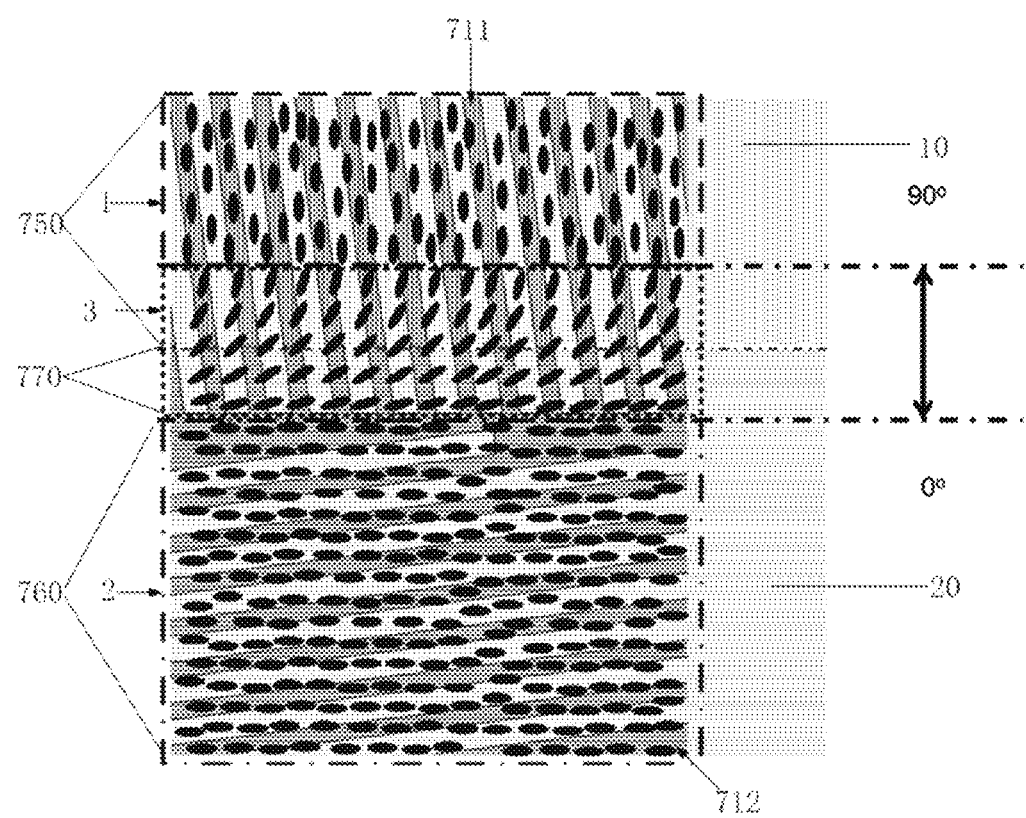
FIG. 12 is a planar view showing corresponding relationship among states of the liquid crystal molecules, the alignment film and the pixel unit when the display panel is not powered according to the third embodiment of the present disclosure.

According to the arrangement relationship between the alignment films and the electrodes in FIG. 11, after the electric field is applied to the electrodes of each of the electrode regions and then the applied electric field is withdrawn, under coactions of the electric field and the alignment films, as shown in FIGS. 12 and 5, the liquid crystal molecules in the liquid crystal layer 500 define the first sub-unit region 1, the second sub-unit region 2 and the third sub-unit region 3. The liquid crystal molecules at the first sub-unit region 1 and the second sub-unit region 2 are aligned in the first initial alignment direction and the second initial alignment direction, respectively. The liquid crystal molecules at the third sub-unit region 3 are aligned in the third initial alignment direction. The third initial alignment direction is an alignment direction in a rotation from the first initial alignment direction towards the second initial alignment direction along the first rotation direction. Thus, referring to FIGS. 11 and 12, the first sub-unit region 1 corresponds to a first portion of the first electrode region 750; the third sub-unit region 3 corresponds to a combined region composed of the third electrode region 770 and a second portion of the first electrode region 750; and the second sub-unit region 2 corresponds to the second electrode region 760. The first and second portions of the first electrode region 750 are combined to form the first electrode region 750. The second portion of the first electrode region 750 is arranged adjacent to the third electrode region 770. The first initial alignment direction is identical to the first rubbing direction, and the second initial alignment direction is identical to the second rubbing direction. Specifically, as shown in FIG. 12, the first rubbing direction is perpendicular to the second rubbing direction, i.e., the first initial alignment direction is also perpendicular to the second initial alignment direction.

Figure 13:
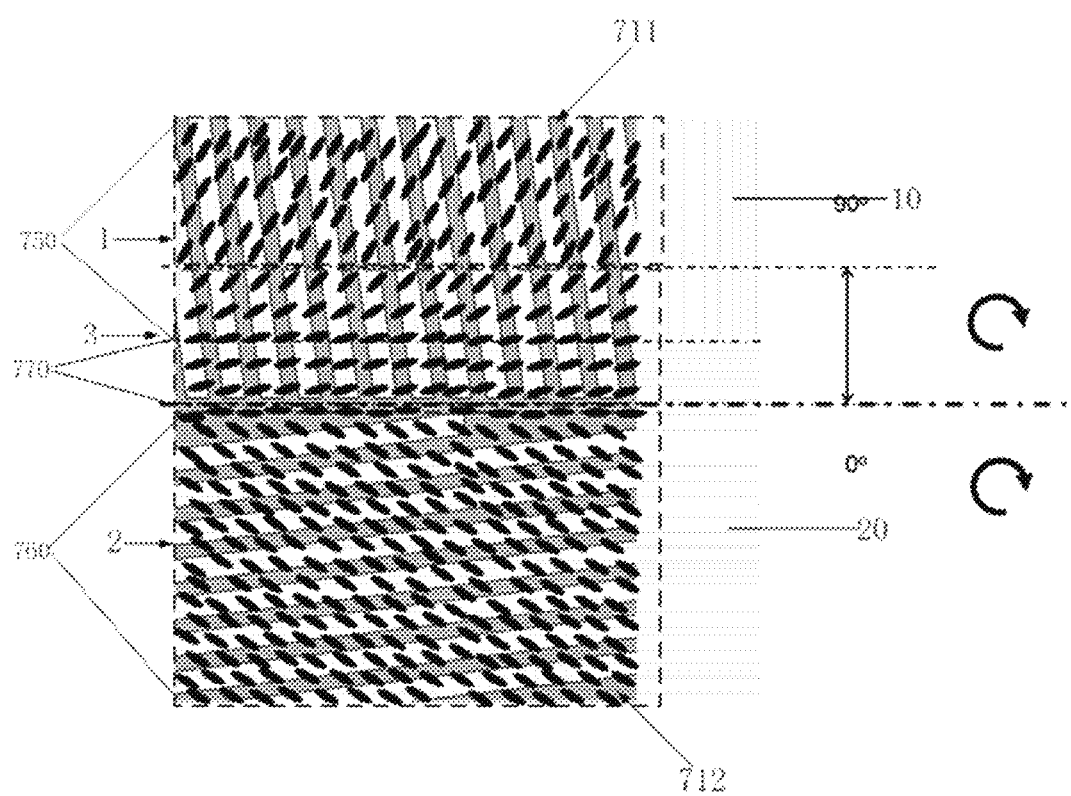
FIG. 13 is a planar view showing corresponding relationship among states of the liquid crystal molecules, the alignment film and the pixel unit when the display panel is powered according to the third embodiment of the present disclosure.

Based on an initial state as shown in FIG. 12, when powered, a structure in FIG. 13 is obtained. The liquid crystal molecules at the first sub-unit region 1 have a first direction; the liquid crystal molecules at the second sub-unit region 2 have a second direction; and the liquid crystal molecules at the third sub-unit region 3 have a third reaction. The third direction is a direction in a rotation from the first direction towards the second direction along the first rotation direction. Referring to FIGS. 11, 12 and 13, when powered, an identical electric field is applied to the first sub-unit region 1 and the third sub-unit region 3, but the state shown in FIG. 13 is obtained because the liquid crystal molecules have different initial alignment directions.

According to the display panel in the third embodiment, the liquid crystal molecules at a boundary region of the alignment films, e.g., a region corresponding to the third sub-unit region 3, are arranged regularly under action of the electric field, thereby to prevent the occurrence of the disclination points at the region when powered.

Fourth Embodiment

In addition, the present disclosure further provides a fourth embodiment of the display panel. Similar to the third embodiment, referring to FIGS. 5 and 14, in the array substrate of the fourth embodiment, the first electrode layer 701 includes the first electrode region 750, the second electrode region 760, and the third electrode region 770.

A plurality of first electrodes 711 arranged parallel to each other and having a first extension direction is arranged in the first electrode region 750. A plurality of second electrodes 712 arranged parallel to each other and having a second extension direction is arranged in the second electrode region 760. A plurality of third electrodes 713 arranged parallel to each other and having a third extension direction is arranged in the third electrode region 770. The third electrode region 770 is arranged between the first electrode region 750 and the second electrode region 760. The first extension direction is different from the second extension direction, and an angle difference between the first extension direction and the second extension direction is greater than 0° and less than or equal to 90°, and alternatively 90°. In addition, referring to FIG. 5, the display panel further includes the first alignment film 400 and the second alignment film 600 arranged at two sides of the liquid crystal layer 500. The first alignment film 400 and the second alignment film 600 each include the first alignment region 10 having a first rubbing direction and the second alignment region 20 having a second rubbing direction. Alternatively, an angle difference between the first rubbing direction and the second rubbing direction is 90°.

Different from the third embodiment, the third extension direction is different from the first extension direction in the fourth embodiment. Alternatively, each of the first electrodes 711 is connected to one third electrode 713. An acute angle between the third extension direction and the horizontal direction is less than an acute angle between the first extension direction and the horizontal direction. Alternatively, the acute angle between the third extension direction and the horizontal direction is in a range of 0° to 45°, so that the liquid crystal molecules at the third sub-unit region 3 may be aligned in a more regular manner under action of the electric field, thereby to prevent the occurrence of the disclination points in a better manner. In addition, as shown in FIG. 14, the first electrode 711, the second electrode 712 and the third electrode 713 may be electrically connected to each other or respectively connected to a lead, and corresponding signals are input thereto.

In addition, the first alignment region 10 corresponds to the first electrode region 750, and the second alignment region 20 corresponds to a combined region composed of the second electrode region 750 and the third electrode region 760. An acute angle between the first rubbing direction of the first alignment region 10 and the first extension direction is 3° to 25°, and an acute angle between the second rubbing direction of the second alignment region 20 and the second extension direction is 3° to 25°.

Figure 14:
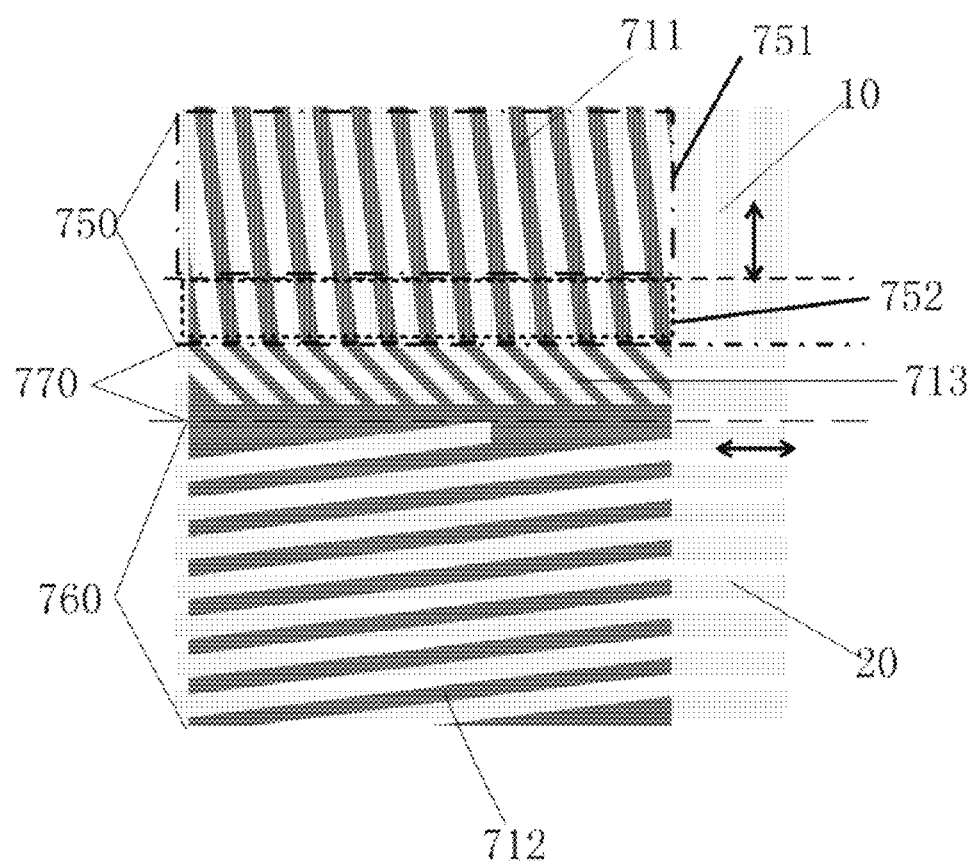
FIG. 14 is a planar view showing corresponding relationship between an alignment film and a pixel unit in a display panel according to a fourth embodiment of the present disclosure.

According to the arrangement relationship between the alignment films and the electrodes as shown in FIG. 14, after the electric field is applied to the electrodes of each of the electrode regions and then the applied electric field is withdrawn, as shown in FIGS. 14 and 5, under coactions of the electric field and the alignment films, the liquid crystal molecules in the liquid crystal layer 500 defines the first sub-unit region 1, the second sub-unit region 2 and the third sub-unit region 3. The liquid crystal molecules at the first sub-unit region 1 and the second sub-unit region 2 are aligned in the first initial alignment direction and the second initial alignment direction, respectively. The liquid crystal molecules at the third sub-unit region 3 are aligned in the third initial alignment direction. The third initial alignment direction is an alignment direction in a rotation from the first initial alignment direction towards the second initial alignment direction along the first rotation direction. The first initial alignment direction is identical to the first rubbing direction, and the second initial alignment direction is identical to the second rubbing direction. Specifically, in FIG. 14, the first rubbing direction is perpendicular to the second rubbing direction, i.e., the first initial alignment direction is also perpendicular to the second initial alignment direction.

Figure 15:
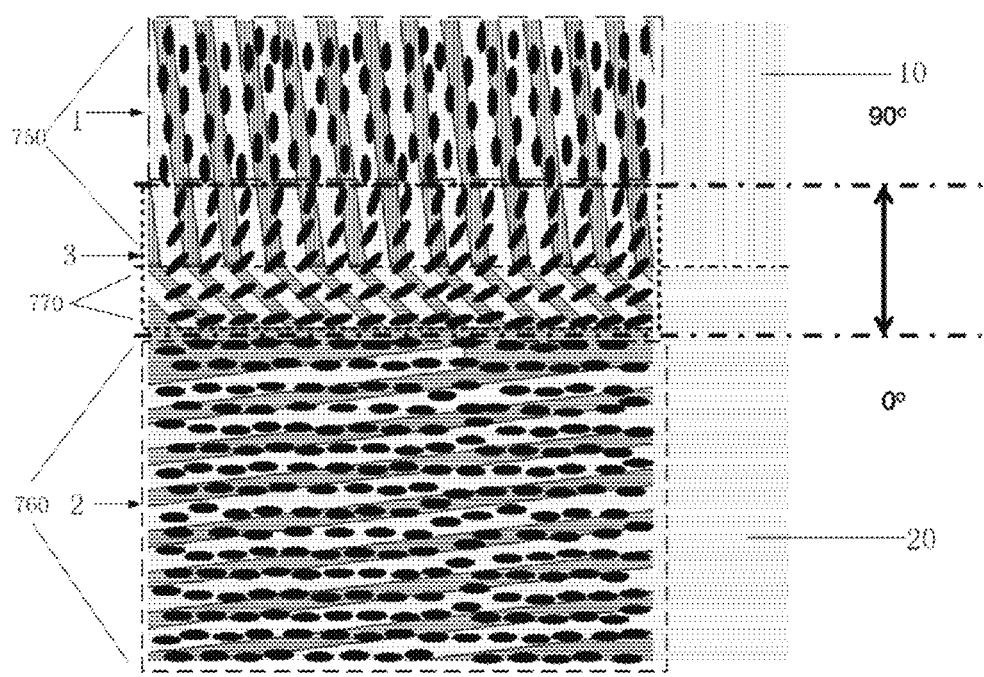
FIG. 15 is a planar view showing corresponding relationship among states of the liquid crystal molecules, the alignment film and the pixel unit when the display panel is not powered according to the fourth embodiment of the present disclosure.

Referring to FIGS. 14 and 15, the first sub-unit region 1 corresponds to the first portion 751 of the first electrode region 750; the third sub-unit region 3 corresponds to a combined region composed of the third electrode region 770 and the second portion 752 of the first electrode region 750; and the second sub-unit region 2 corresponds to the second electrode region 760. The first portion 751 and the second portion 752 of the first electrode region 750 are combined to form the first electrode region 750. The second portion 752 of the first electrode region 750 is arranged adjacent to the third electrode region 770.

Figure 16:
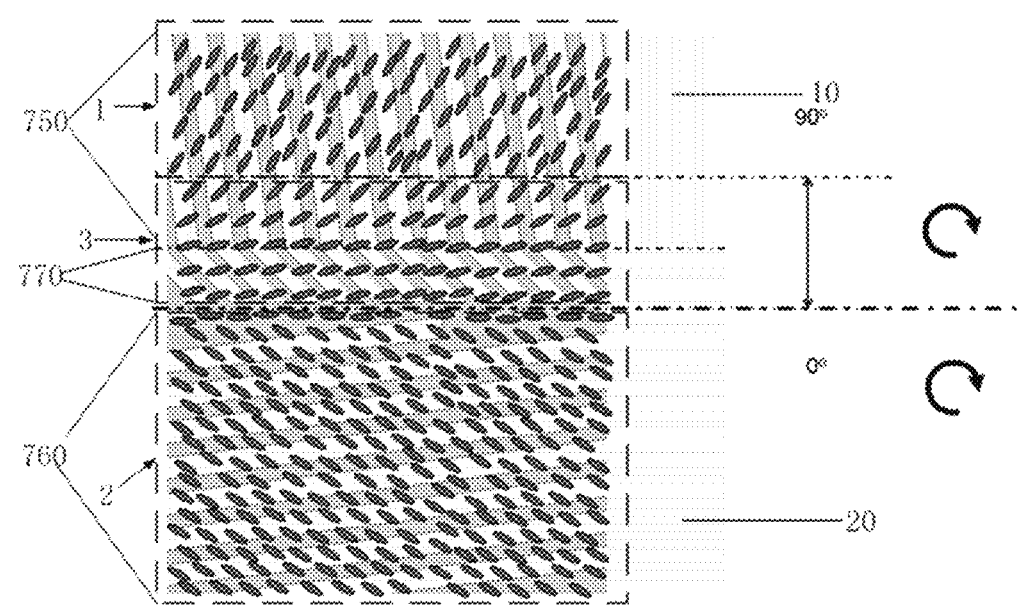
FIG. 16 is a planar view showing corresponding relationship among states of the liquid crystal molecules, the alignment film and the pixel unit when the display panel is powered according to the fourth embodiment of the present disclosure.

When powered, a structure as shown in FIG. 16 is obtained. The liquid crystal molecules at the first sub-unit region 1 have a first direction. The liquid crystal molecules at the second sub-unit region 2 have a second direction. The liquid crystal molecules at the third sub-unit region 3 have a third direction. The third direction is a direction in a rotation from the first direction towards the second direction along the first rotation direction.

According to the third and fourth embodiments of the present disclosure, through the cooperation of the first alignment film 400 and the second alignment film 600 with the electrodes, a voltage is applied to the electrodes so as to deflect the liquid crystal molecules in the initial state, and when no voltage is applied, the liquid crystal molecules in the liquid crystal layer corresponding to the first sub-unit region 1, the second sub-unit region 2 and the third sub-unit region 3 are aligned in accordance with the alignment directions of the alignment films. Then, the liquid crystal molecules in the liquid crystal layer corresponding to the third sub-unit region 3 are regularly arranged in the third initial alignment direction. Similarly, after an electric field is applied, the liquid crystal molecules in the liquid crystal layer corresponding to the third sub-unit region 3 are uniformly arranged under action of the electric field of the third electrodes 713 arranged between the first electrodes 711 and the second electrodes 712. As a result, it is able to prevent the occurrence of the disclination points at the region both in the initial alignment state and in a case where the electric field is applied.

Alternatively, in the third and fourth embodiments, in order to prevent the occurrence of the disclination points at the third sub-unit region 3 between the first sub-unit region 1 and the second sub-unit region 2 when unpowered, a difference between the first rubbing direction and the second rubbing direction is less than 90°. Alternatively, the first rubbing direction is a direction where a first standard alignment direction is deflected by a first angle towards the first direction, and the second rubbing direction is a direction where a second standard alignment direction is deflected by a second angle towards a direction which is opposite to the first direction. A difference between the first standard alignment direction and the second standard alignment direction is 90°. Optimally, the first angle is less than or equal to 1°, an angle between the first standard alignment direction and the horizontal direction is 90°, and an angle between the second standard alignment direction and the horizontal direction is 0°.

According to the display panel in the third and fourth embodiments, the arrangement mode of the electrodes is improved, so as to further prevent the occurrence of the disclination points at the predetermined region, thereby to ensure the display brightness evenness of the display panel.

On the basis of the above embodiments, the liquid crystal molecules in the liquid crystal layer may be heated and then an electric field may be applied, so that the liquid crystal molecules are regularly arranged after the display panel is powered, thereby to further prevent the occurrence of the disclination points at the predetermined region after the display panel is powered. For example, when the liquid crystal molecules are injected into a cell, the cell is heated to obtain an anisotropic liquid phase (Phase I). Then, in case that an electric field is applied, the liquid crystals are slowly cooled to a nematic phase (Phase N). Through the application of the electric field after the heating causes the liquid crystal molecules at the boundary region between two regions to be arranged in a specific direction, thereby to prevent the occurrence of the disclination points at the predetermined region.

Figure 17:
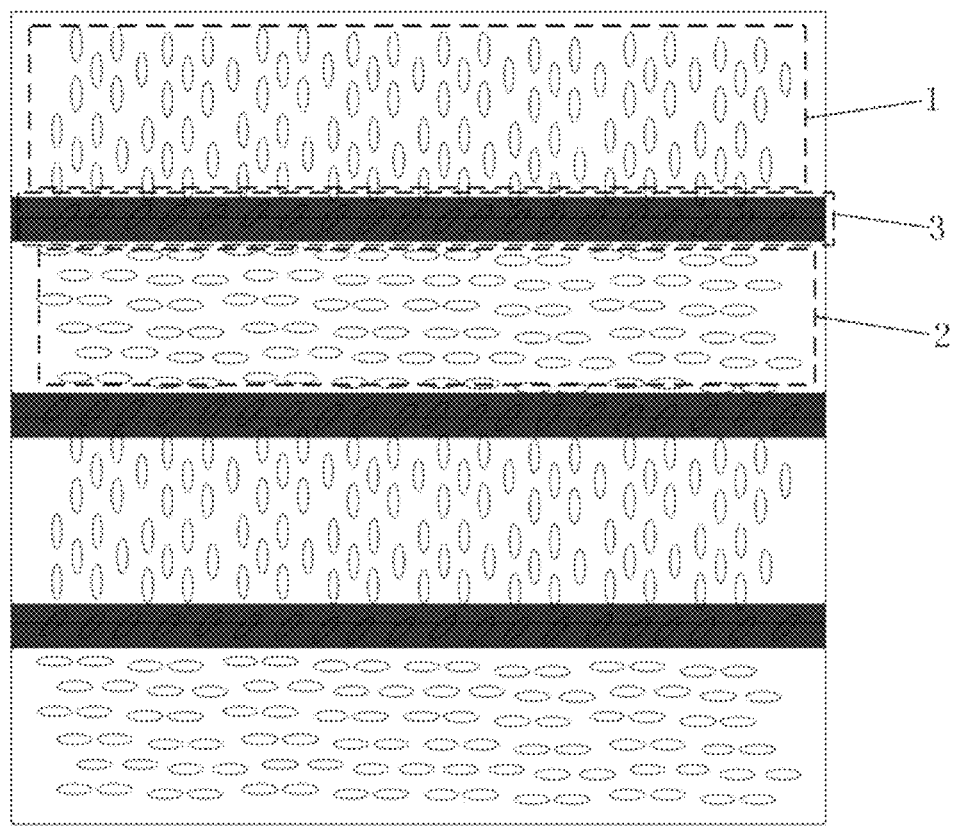
FIG. 17 is a schematic view showing a display panel according to a fifth embodiment of the present disclosure.

Further, the present disclosure provides in the fifth embodiment a display panel including the structure in FIG. 17, which shows the liquid crystal molecules in regions corresponding to one pixel unit. A black matrix is provided in a region corresponding to the third sub-unit region 3 so as to cover the third sub-unit region 3, thereby to prevent the occurrence of light leakage at the third sub-unit region 3.

Figure 18:
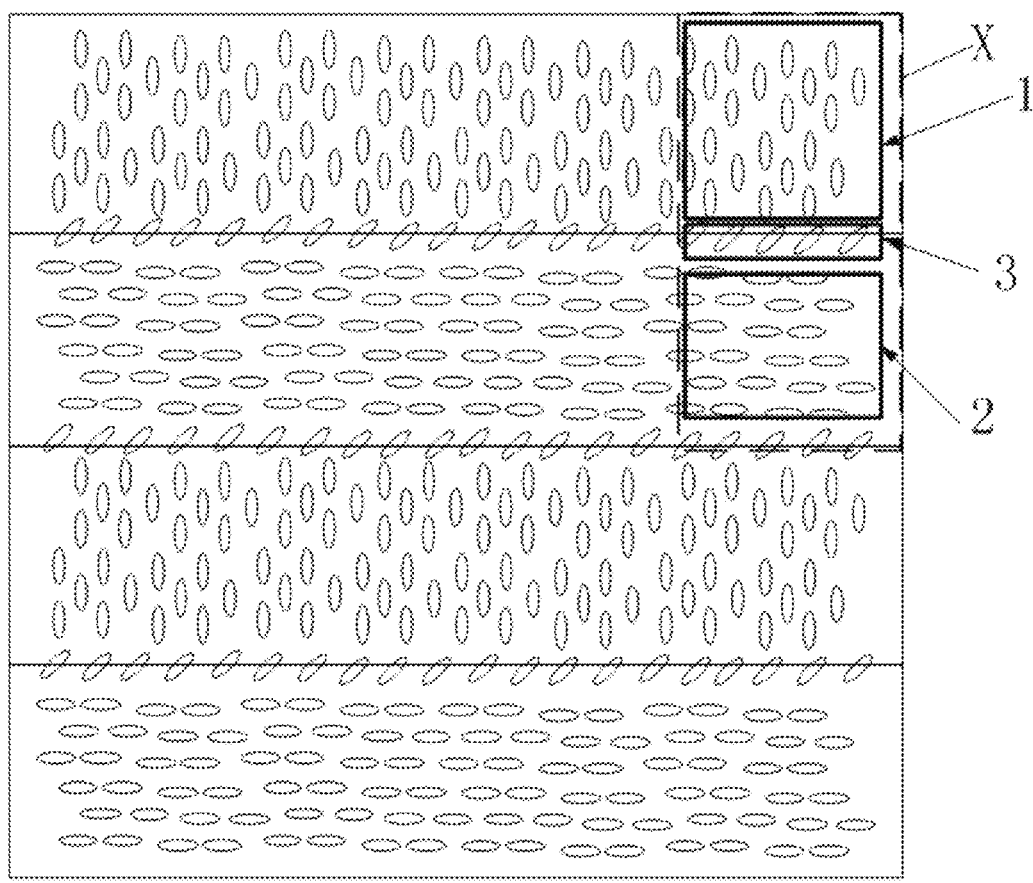
FIG. 18 is a schematic view showing a first initial state of liquid crystal molecules in a display device according to one embodiment of the present disclosure.

According to the display device in the above-mentioned embodiments, in the entire display device, the liquid crystal molecules corresponding to the third sub-unit regions of the pixel units may be aligned in an identical initial alignment direction, so as to obtain the state as shown in FIG. 18. FIG. 18 is a schematic view showing a first initial state of the liquid crystal molecules in the display device, and showing a first state of the liquid crystal molecules in corresponding regions of the entire display panel, where a region X defines a corresponding region of one pixel unit. A combination of the first sub-unit region 1, the second sub-unit region 2 and the third sub-unit region 3 corresponds to one pixel unit. The third sub-unit regions 3 of the entire display device have one identical third initial alignment direction, so that the disclination points do not occur in the entire display device. In other words, in the above first to fourth embodiments, by improving the rubbing directions of the alignment films, or a combination of the rubbing directions of the alignment films and the arrange modes of the electrodes, it is able to prevent the occurrence of the disclination points in the entire display device.

Figure 19:
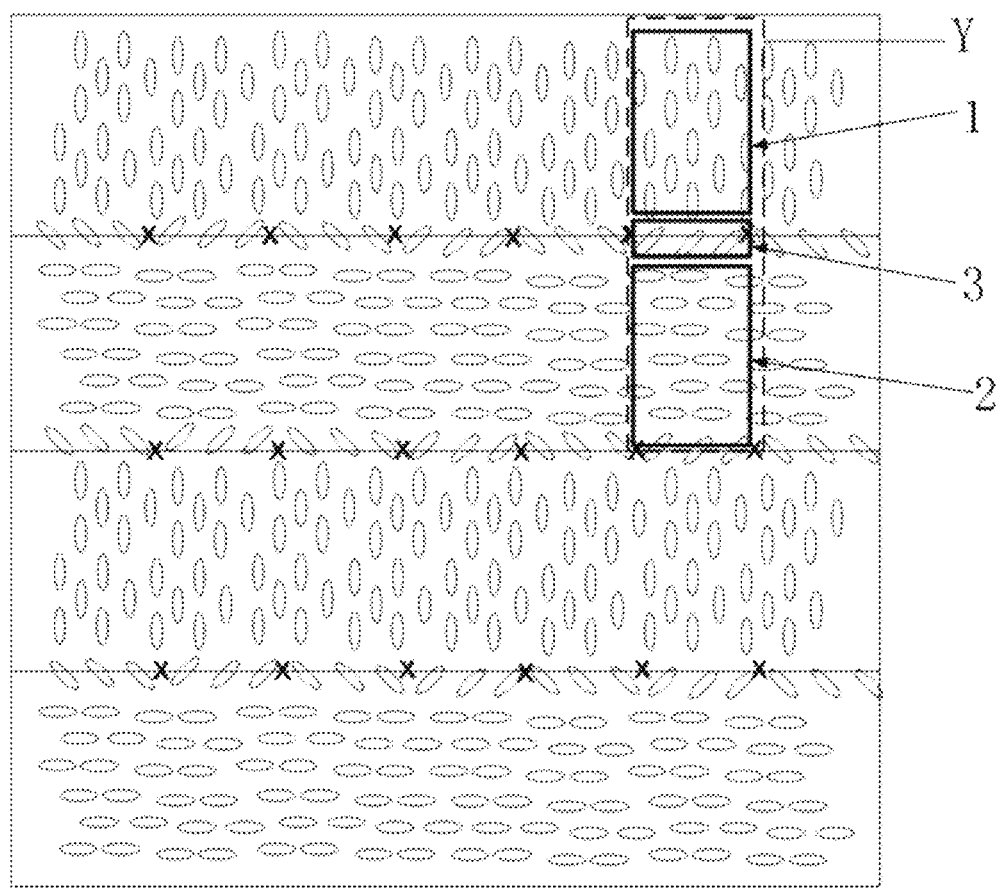
FIG. 19 is schematic view showing a second initial state of liquid crystal molecules in a display device according to one embodiment of the present disclosure.

FIG. 19 is a schematic view showing a second initial state of the liquid crystal molecules in the display panel of the entire display device. In the entire display device, the liquid crystal molecules corresponding to the third sub-unit regions of the pixel units may have different initial alignment directions, the liquid crystal molecules having one alignment direction and the liquid crystal molecules having another alignment direction are arranged alternately. In the state as shown in FIG. 19, the liquid crystal molecules having an alignment direction of 45° and the liquid crystal molecules having an alignment direction of −45° are arranged alternately. However, the arrangement mode of the liquid crystal molecules in the third sub-unit regions is not limited thereto, as long as the liquid crystal molecules are arranged regularly.

Referring to FIG. 19, a combination of the first sub-unit region 1, the second sub-unit region 2 and the third sub-unit region 3 corresponds to one pixel unit. One region Y defines a corresponding region of one pixel unit. An initial alignment direction of liquid crystal molecules corresponding to a third sub-unit region 3 in a pixel unit region adjacent to the region Y is different from that of the region Y, and the disclination points occur. Through this structure, it is able to prevent the occurrence of disclination points in all the regions Y by improving the rubbing directions of the alignment films or a combination of the rubbing directions of the alignment films and the arrangement modes of the electrodes according to one of the above first to fourth embodiment. Although the declination points may occur between the adjacent regions Y, the positions of the disclination points are controllable. In this way, it is able to specifically correct the disclination points at controllable positions, thereby to weaken the affect of the disclination points on the display.

Figure 20:
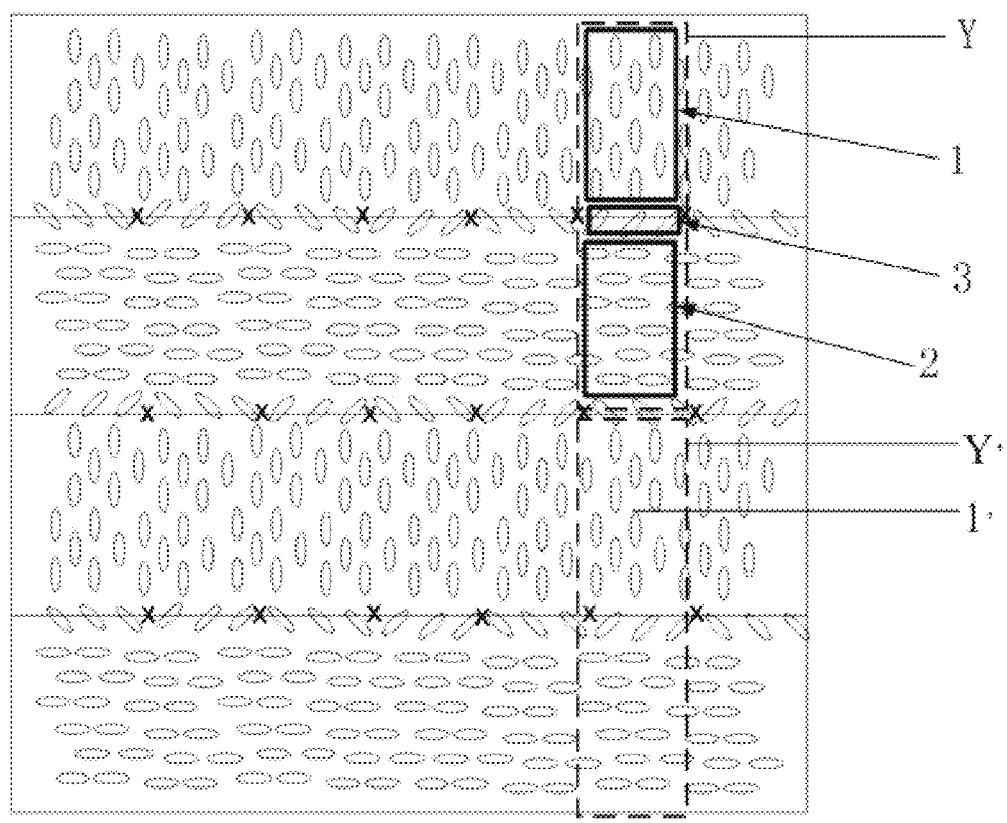
FIG. 20 is a schematic view showing a third initial state of liquid crystal molecules in a display device according to one embodiment of the present disclosure.

FIG. 20 shows another mode of the structure in FIG. 19. As shown in FIG. 20, an alignment direction of liquid crystal molecules corresponding to a third sub-unit region 3 in one region Y is different from an alignment direction of the liquid crystal molecules at a boundary between the region Y and an other regions Y' adjacent to the region Y in a column direction.

Figure 21:
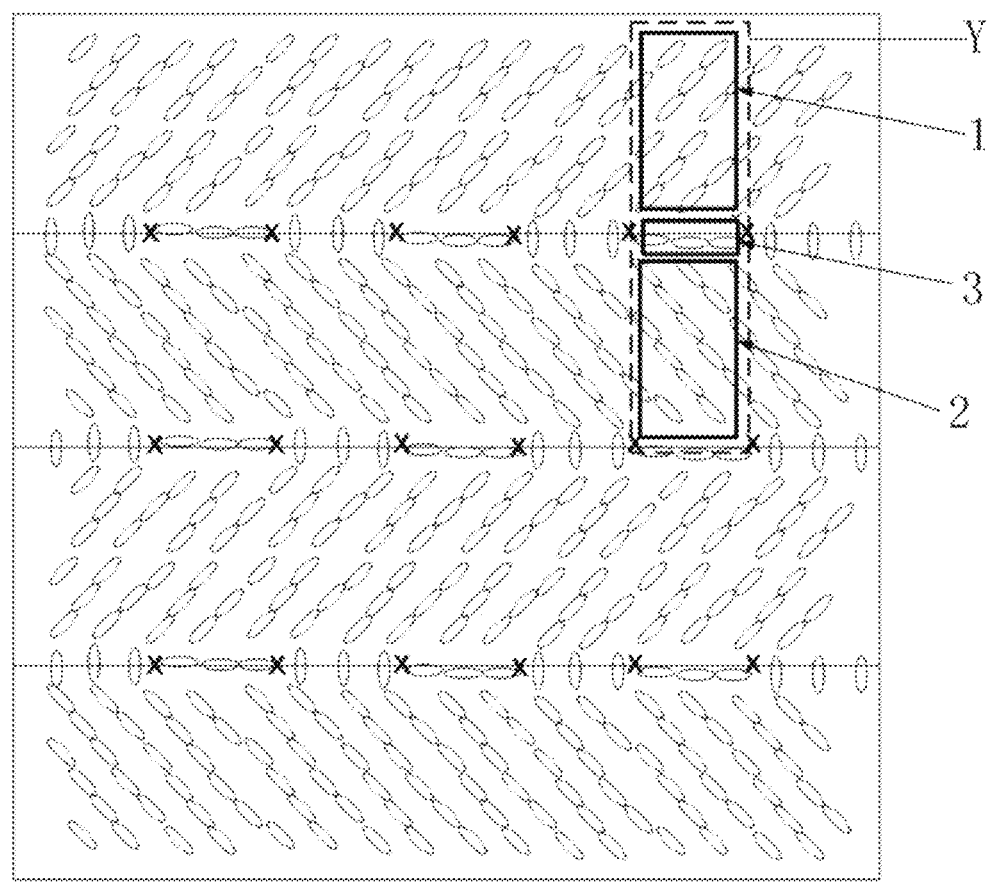
FIG. 21 is a schematic view showing a fourth initial state of liquid crystal molecules in a display device according to one embodiment of the present disclosure.

FIG. 21 is a schematic view showing another state of liquid crystal molecules when unpowered. In this state, in one region Y, liquid crystal molecules corresponding to the first sub-unit region 1, the second sub-unit region 2 and the third sub-unit region 3 are deflected, respectively. In one region Y, liquid crystal molecules at the third sub-unit region 3 are aligned horizontally, while liquid crystal molecules at the third sub-unit region 3 in an adjacent other region Y are aligned vertically. The liquid crystal molecules at the third sub-unit region 3 of the region Y are perpendicular to the liquid crystal molecules at the third sub-unit region 3 of the adjacent region Y.

According to the display panel in the embodiments of the present disclosure, it is able to prevent the occurrence of the disclination points in the entire display device, or to prevent the occurrence of the disclination points at the predetermined region. The predetermined region may include one or more pixel units, or may be the entire display device, so as to enable the occurrence of the disclination points to be controllable, thereby to prevent the display brightness evenness from being adversely affected. The present disclosure further provides in one embodiment a display device including the above display panel. A person skilled in the art may know specific structures of the display device including the above display panel, which will not be particularly defined herein.

It should be appreciated that, the descriptions are provided in the above embodiments by taking one pixel unit as a basic unit where no disclination point occurs. However, apart from one pixel unit, the basic unit where no disclination point occurs may also be a region larger than or smaller than one pixel unit. When the basic unit is a region smaller than one pixel unit, it is able to prevent the occurrence of the disclination points at this region. Based on the above-mentioned controllable mode of the disclination points, at this time, a corresponding region of one pixel unit may include a plurality of basic units, and the disclination points may be regularly formed among the basic units according to design.

The display device having the above structures of the present disclosure may be, but not limited to, a mobile phone, a TV or a monitor.

The above are merely exemplary embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A display panel, comprising a liquid crystal layer and a pixel unit, the pixel unit comprising a first sub-unit region and a second sub-unit region; liquid crystal molecules in the liquid crystal layer corresponding to the first sub-unit region having a first initial alignment direction; liquid crystal molecules in the liquid crystal layer corresponding to the second sub-unit region having a second initial alignment direction; wherein the pixel unit further comprises a third sub-unit region arranged between the first sub-unit region and the second sub-unit region; liquid crystal molecules in the liquid crystal layer corresponding to the third sub-unit region have a third initial alignment direction; the third initial alignment direction is an alignment direction in a rotation from the first initial alignment direction towards the second initial alignment direction along a first rotation direction; and an angle difference between the first initial alignment direction and the second initial alignment direction is greater than 0° and less than or equal to 90°.

2. The display panel according to claim 1, further comprising a first substrate and a second substrate; wherein the liquid crystal layer is arranged between the first substrate and the second substrate; the pixel unit is formed on the first or second substrate.

3. The display panel according to claim 2, wherein the third sub-unit region comprises a first boundary which divides the first sub-unit region from the third sub-unit region, and a second boundary which divides the second sub-unit region from the third sub-unit region; and at the third sub-unit region, from the first boundary to the second boundary, liquid crystal molecules corresponding to regions with different distances to the first boundary have third initial alignment directions; the third initial alignment directions are changed in a manner of rotation from the first initial alignment direction towards the second initial alignment direction along the first rotation direction.

4. The display panel according to claim 1, wherein the third sub-unit region comprises a first portion and a second portion; the first portion of the third sub-unit region is arranged adjacent to the first sub-unit region; the second portion of the third sub-unit region is arranged adjacent to the second sub-unit region;
the display panel further comprises an alignment film arranged at each of two sides of the liquid crystal layer; the alignment film comprises a first alignment region and a second alignment region; the first alignment region corresponds to a combined region composed of the first sub-unit region and the first portion of the third sub-unit region; the second alignment region corresponds to a combined region composed of the second sub-unit region and the second portion of the third sub-unit region; and
the first alignment region has a first rubbing direction; the second alignment region has a second rubbing direction; an angle between the first rubbing direction and the second rubbing direction is greater than 0° and less than 90°.

5. The display panel according to claim 4, wherein an acute angle between the first rubbing direction and the second rubbing direction is greater than 88°.

6. The display panel according to claim 5, wherein an angle between the first rubbing direction and a horizontal direction is 89.8°, and an angle between the second rubbing direction and the horizontal direction is 0.2°.

7. The display panel according to claim 1, further comprising an alignment film arranged at each of two sides of the liquid crystal layer, wherein the alignment film comprises a first alignment region, a second alignment region and a third alignment region arranged between the first alignment region and the second alignment region; the first alignment region has a first rubbing direction; the second alignment region has a second rubbing direction; the third alignment region has a third rubbing direction different from the first and second rubbing directions; the first alignment region corresponds to the first sub-unit region; the second alignment region corresponds to the second sub-unit region; the third alignment region corresponds to the third sub-unit region.

8. The display panel according to claim 7, wherein an angle between the first rubbing direction and the second rubbing direction is 90°.

9. The display panel according to claim 8, wherein an angle between the third rubbing direction and the first or second rubbing direction is 45°.

10. The display panel according to claim 1, further comprising an alignment film, a first electrode region, a second electrode region, and a third electrode region; wherein
the alignment film is arranged at each of two sides of the liquid crystal layer; the alignment film comprises a first alignment region and a second alignment region; the first alignment region has a first rubbing direction and the second alignment region has a second rubbing direction;
a plurality of first electrodes arranged parallel to each other and having a first extension direction is arranged at the first electrode region;
a plurality of second electrodes arranged parallel to each other and having a second extension direction different from the first extension direction is arranged at the second electrode region;
a plurality of third electrodes arranged parallel to each other and having a third extension direction is arranged at the third electrode region; the third electrode region is arranged between the first electrode region and the second electrode region;
the first alignment region corresponds to the first electrode region; the second alignment region corresponds to a combined region composed of the second electrode region and the third electrode region;
the first electrode region comprises a first portion and a second portion, the second portion of the first electrode region is arranged adjacent to the third electrode region; and
the first sub-unit region corresponds to the first portion of the first electrode region; the third sub-unit region corresponds to a combined region composed of the third electrode region and the second portion of the first electrode region; the second sub-unit region corresponds to the second electrode region.

11. The display panel according to claim 10, wherein an angle between the first rubbing direction and the second rubbing direction is 90°; an angle between the first extension direction and the second extension direction is 90°; the first extension direction is identical to the third extension direction, an acute angle between the first rubbing direction and the first extension direction is 3° to 25° ; and an acute angle between the second rubbing direction and the second extension direction is 3° to 25°.

12. The display panel according to claim 10, wherein an angle between the first rubbing direction and the second rubbing direction is 90°; an angle between the first extension direction and the second extension direction is 90°; the third extension direction is different from the first extension direction, an acute angle between the first rubbing direction and the first extension direction is 3° to 25 ; and an acute angle between the second rubbing direction and the second extension direction is 3° to 25°.

13. The display panel according to claim 12, wherein an acute angle between the third extension direction and a horizontal direction is less than an acute angle between the first extension direction and the horizontal direction.

14. The display panel according to claim 13, wherein an acute angle between the third extension direction and the first extension direction is greater than 0° and less than or equal to 45°.

15. The display panel according to claim 1, further comprising a black matrix corresponding to the third sub-unit region.

16. A display device, comprising the display panel according to claim 1.

17. The display panel according to claim 1, wherein the first rotation direction is a clockwise direction.

18. The display panel according to claim 1, wherein the first rotation direction is a counter-clockwise direction.

19. The display panel according to claim 4, wherein the third sub-unit region comprises a first boundary which divides the first sub-unit region from the third sub-unit region, and a second boundary which divides the second sub-unit region from the third sub-unit region; and
at the third sub-unit region, from the first boundary to the second boundary, liquid crystal molecules corresponding to regions with different distances to the first boundary have third initial alignment directions; the third initial alignment directions are changed in a manner of rotation from the first initial alignment direction towards the second initial alignment direction along the first rotation direction.

20. The display panel according to claim 7, wherein the third sub-unit region comprises a first boundary which divides the first sub-unit region from the third sub-unit region, and a second boundary which divides the second sub-unit region from the third sub-unit region; and
- at the third sub-unit region, from the first boundary to the second boundary, liquid crystal molecules corresponding to regions with different distances to the first boundary have third initial alignment directions; the third initial alignment directions are changed in a manner of rotation from the first initial alignment direction towards the second initial alignment direction along the first rotation direction.

\* \* \* \* \*